United States Patent [19]

Hunt et al.

[11] Patent Number: 4,924,697

[45] Date of Patent: May 15, 1990

[54] TIRE-MOUNTED AIR PRESSURE GAUGE ASSEMBLY

[75] Inventors: Glen R. Hunt, Cedar; John F. McDaniel, Roseville, both of Minn.

[73] Assignee: Permanent Tire Gauge Company, Inc., Roseville, Minn.

[21] Appl. No.: 253,976

[22] Filed: Oct. 5, 1988

Related U.S. Application Data

[63] Continuation-in-part of Ser. No. 142,543, Jan. 1, 1988, abandoned.

[51] Int. Cl.⁵ .............................................. B60C 23/04
[52] U.S. Cl. ...................................... 73/146.8; 73/743
[58] Field of Search ............... 73/146.8, 146.5, 146.2, 73/146, 741, 742, 743; 137/227, 228, 229

[56] References Cited

U.S. PATENT DOCUMENTS

| | | | |
|---|---|---|---|
| 1,061,472 | 5/1913 | Hackley | 73/146.8 |
| 1,196,226 | 8/1916 | Frazier et al. | 73/146.8 |
| 1,214,781 | 2/1917 | Harrison et al. | 152/427 |
| 1,237,512 | 8/1917 | Harrison et al. | 73/146.2 |
| 1,330,311 | 2/1920 | Engelmann et al. | 73/146.8 |
| 1,806,372 | 5/1931 | Stille | 116/34 R |
| 1,820,120 | 3/1930 | Collins | 137/227 |
| 1,893,222 | 1/1933 | Bronson | 73/146.8 |
| 2,225,674 | 12/1940 | West | 116/34 |
| 2,368,564 | 1/1945 | Pascoo | 137/69.5 |
| 2,520,758 | 8/1950 | Crownover | 116/DIG. 45 |
| 3,208,425 | 9/1965 | Jousma et al. | 73/146.8 |
| 3,303,696 | 2/1967 | Capparelle | 73/146.8 |
| 3,536,026 | 10/1970 | Miller | 116/34 |
| 3,592,218 | 7/1971 | Guy | 137/227 |
| 3,719,159 | 3/1973 | Davis | 116/34 |
| 3,787,806 | 1/1974 | Church | 340/58 |
| 3,906,988 | 9/1975 | Mottram | 137/227 |
| 3,937,077 | 2/1976 | Klamm | 73/146.8 |
| 3,999,430 | 12/1976 | Parduhn | 73/146.3 |
| 4,072,926 | 2/1978 | Shimahara et al. | 340/58 |
| 4,126,772 | 11/1978 | Pappas et al. | 200/61.25 |
| 4,163,208 | 7/1979 | Merz | 340/58 |
| 4,244,214 | 1/1981 | Curran | 73/146.8 |
| 4,248,080 | 2/1981 | Chuck | 73/146.8 |
| 4,262,529 | 4/1981 | Rosenblatt et al. | 73/146.8 |
| 4,279,161 | 7/1981 | Huston et al. | 73/743 |
| 4,310,104 | 1/1982 | Parker | 137/227 |
| 4,366,708 | 1/1983 | Warihashi | 73/146.8 |
| 4,375,788 | 3/1983 | Malec | 116/34 |
| 4,384,543 | 5/1983 | Wong | 116/34 |
| 4,476,803 | 10/1984 | Malec | 116/34 |
| 4,520,664 | 6/1985 | Kramer | 73/146.8 |
| 4,581,925 | 3/1986 | Crutcher | 73/146.8 |
| 4,644,317 | 2/1987 | Aingworth | 340/58 |
| 4,658,644 | 4/1987 | Coesfeld et al. | 73/146.8 |

OTHER PUBLICATIONS

Sync ® Exclusive Tire Check, product no. J83-458, Sync ® Unique Merchandise Mart Holiday 1987 Catalogue, p. 24.

*Primary Examiner*—Donald O. Woodiel
*Attorney, Agent, or Firm*—Kinney & Lange

[57] ABSTRACT

The present invention is an improvement to a tire mounted air pressure gauge for use on vehicles having inflatable tires. The air pressure gauge has a dial face, with a coiled pressure responsive spring expandable to indicate the pressure detected by the gauge. The gauge is mounted directly onto the valve stem of a tire to detect the pressure in the tire, or is mounted onto the valve steam via an L-shaped conduit. The conduit contains a lug adapted to depress the conventional valve core of the valve stem and release air pressure within the valve stem and tire. An arc-shaped or cylindrical retainer is provided on the dial face to limit radial expansion of the coiled spring due to centrifugal forces of the rotating tire and other jarring forces exerted on the pressure gauge during use of the tire.

12 Claims, 3 Drawing Sheets

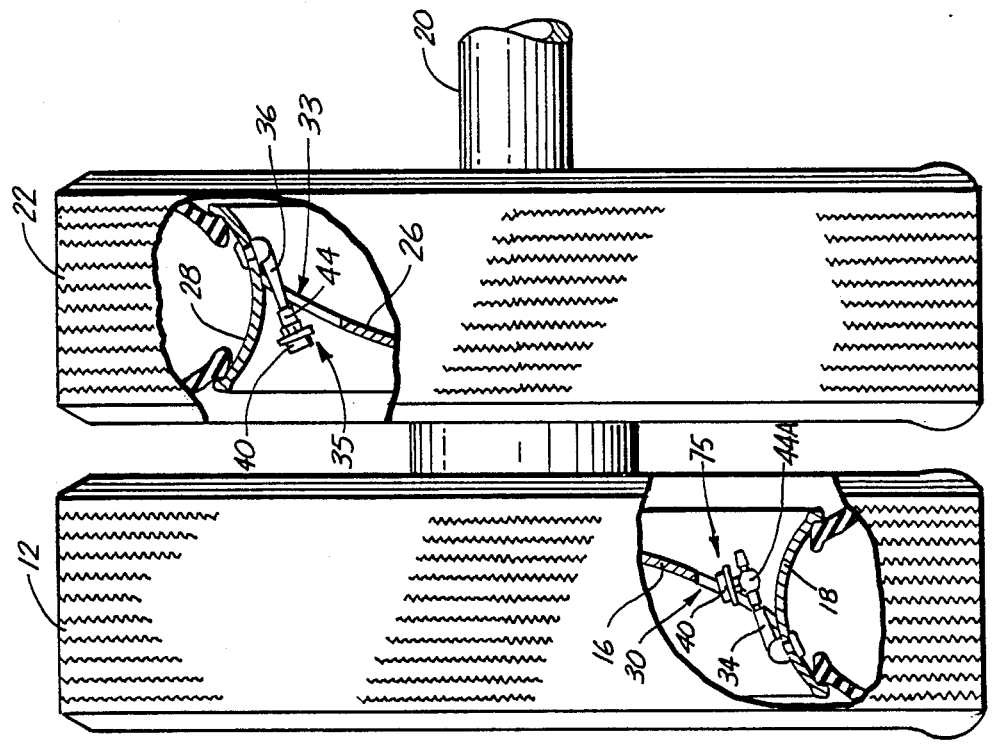
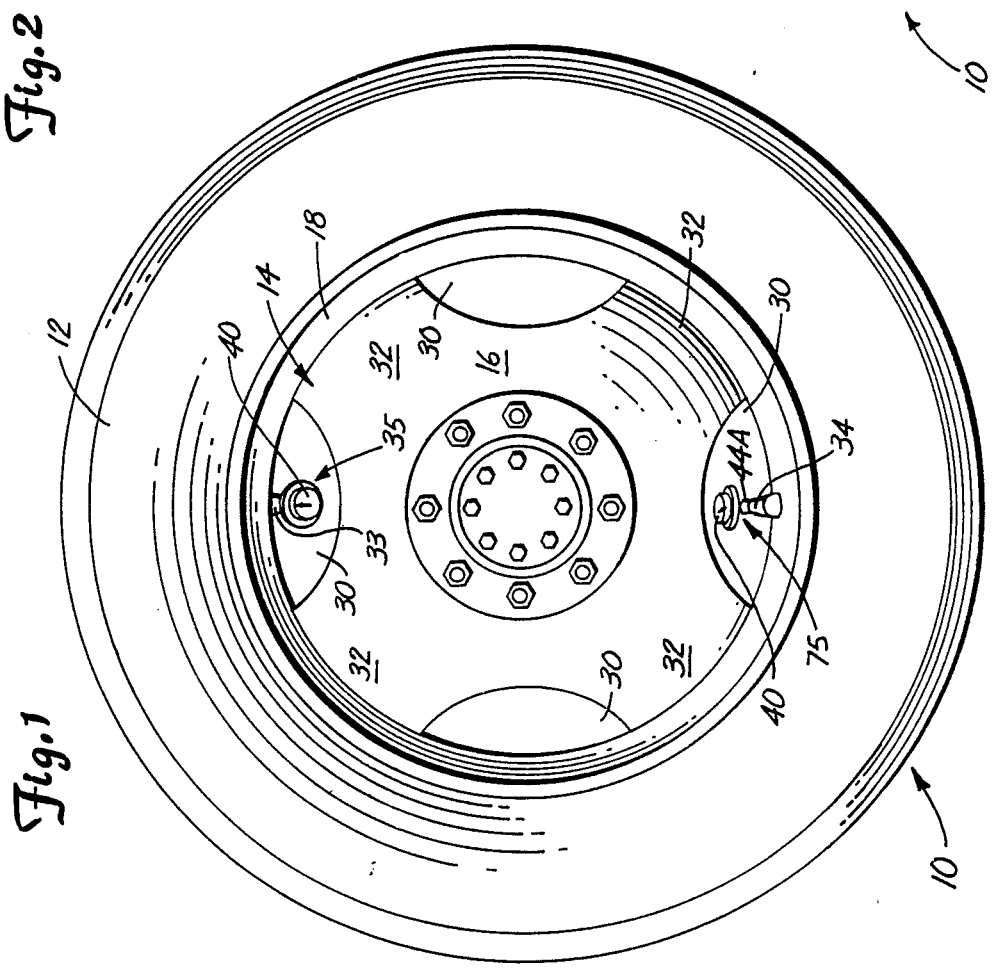

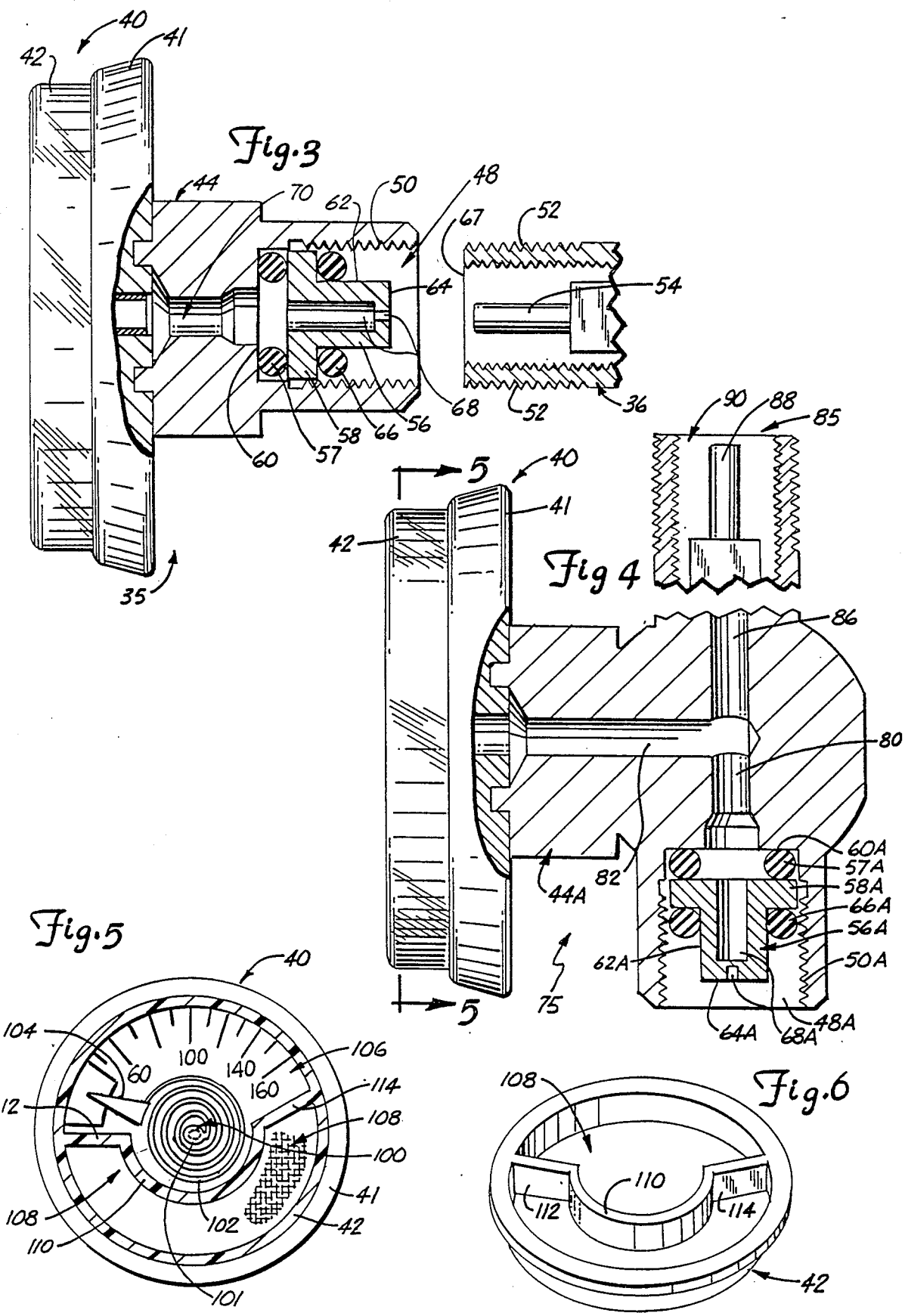

TIRE-MOUNTED AIR PRESSURE GAUGE ASSEMBLY

This is a continuation-in-part of application Ser. No. 142,543, filed Jan. 1, 1988, now abandoned.

BACKGROUND OF THE INVENTION

1. Field of the Invention

This invention relates to tire-mounted air pressure gauges, and specifically to an adapter assembly for allowing easy readability of such gauges on all vehicle tires, including the inner and outer tires on dual wheels.

2. Description of the Prior Art

Maintaining proper inflation of tires is critical for achieving optimum performance in vehicles and keeping operating costs low. Proper inflation increases fuel economy and performance and prolongs tire life. Indeed, a leading cause of the tire failure is underinflation. In addition, government regulations sometimes require careful monitoring of tire inflation and conditions (e.g., on vehicles which are transporting hazardous materials).

Most inflatable tires must have pressure checked by removing a cap from the valve stem and placing a pressure gauge on the valve stem. The pressure gauge depresses the valve core of the valve stem to allow air to escape from the tire and give a reading on the gauge. Once a tire's pressure has been evaluated, the cap must then be replaced and the process repeated for each tire. This involves substantial time and is very difficult when the vehicles involved are semitractor-trailers where the valve stems on some tires are not readily accessible (and there are eighteen inflated tires to check). In dual-wheel arrangements, the job of checking the pressure on all tires is particularly difficult. One attempt to remedy this difficulty is shown in U.S. Pat. No. 4,644,317, where pressure gauges were mounted on the tire of each wheel and a complicated system using electrical impulses was employed to send readings to the driver and check pressure differences between two adjacent tires. Other tire-mountable air pressure gauges are difficult to read because access to the valve stem of the inner tire of a dual-wheel assembly at the close range required for reading the gauge is not easy. The reader must bend down to the tire and work or peer through one or more apertures in the outer wheel.

SUMMARY OF THE INVENTION

The present invention overcomes the problems of the prior art by allowing a person to read an air pressure gauge attached to each valve stem by simply walking around the exterior of a vehicle. The dial faces of the tire-mounted air pressure gauge assemblies of the present invention all point outward so that easy reading is possible. Once attached, the pressure gauge does not require a reader to place or remove anything on a valve stem in order to evaluate the pressure in a tire.

The present invention is designed for use on inflatable tires of a vehicle, wherein each tire has a valve stem with a conventional and depressible valve core therein. A tire pressure gauge having visible pressure indicia on only one side thereof is provided for indicating the air pressure in a tire detected by the gauge. The gauge is sealably mounted to an adapter, which in turn is sealably mounted to the valve stem. The adapter includes means for depressing the valve core of the valve stem to allow air and pressure from the tire to pass through the adapter and to the gauge. The adapter is shaped and aligned to present the visible pressure indicia in direction away from that portion of the tire adjacent the valve stem.

Preferably, the adapter is an L-shaped conduit, and the visible indicia of the pressure gauge is a dial face. The dial face is coated with a reflective covering to make night reading of the dial face easier. In another embodiment, the dial face has a color-coded safe pressure range thereon to indicate when the tire is within a desired inflation range.

The tire-mounted pressure gauge of the present invention includes a coiled spring responsive to tire pressure, and has retainer means for limiting radial expansion of the coiled tube beyond a desired radial expansion limit. This prevents distortion of the coiled tube and pressure gauge readability caused by jarring of the tire in use, and the centrifugal forces acting upon the pressure gauge as it rotates within the tire during use. The retainer means is an curved wall which extends at least partially around the coiled tub, and in one embodiment of the invention, the wall is circular, completely surrounding the coil tube.

The tire-mounted air pressure gauge assembly of the present invention is quite inexpensive, very simple to use, and is lightweight so it does not affect balance of the tire. It saves time and energy and encourages more frequent checking of the air pressure in the tires. This becomes very important when a vehicle has up to eighteen tires to check as with a semi-tractor and trailer and the expense of operating the vehicle is substantial.

BRIEF DESCRIPTION OF THE DRAWINGS

FIG. 1 shows a side outer view of a dual wheel arrangement, with only the outer wheel and tire being visible.

FIG. 2 shows an end view of a dual wheel arrangement, showing both tires and with some parts broken away and in section.

FIG. 3 shows a tire pressure gauge with a straight conduit, and a portion of a valve stem of an inflatable tire, with some parts broken away and in section.

FIG. 4 shows a tire pressure gauge with an L-shaped conduit for connecting the pressure gauge to the valve stem of an outer tire in a dual wheel arrangement, with some parts broken away and in section.

FIG. 5 is a sectional view as taken along lines 5—5 in FIG. 4.

FIG. 6 is a pictoral bottom view of the transparent dial face cover of the tire-mounted pressure gauge of the present invention.

DETAILED DESCRIPTION OF THE PREFERRED EMBODIMENTS

Figure 8:
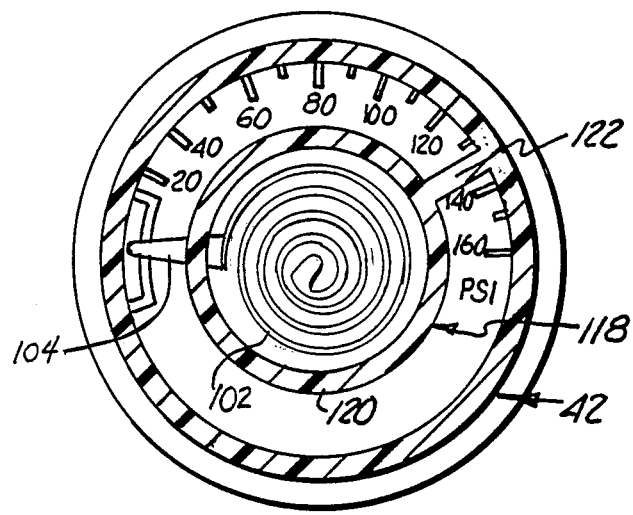
FIG. 8 is a sectional view as taken along lines 5—5 in FIG. 4, and showing the alternative embodiment of the dial face cover in section.

FIGS. 1 and 2 show outer side and end views of a dual wheel tire arrangement 10 on a vehicle such as a semi-trailer rig, but or straight truck (vehicle not shown). An outer inflatable tire 12 is mounted in a conventional manner upon an outer wheel 14. The outer wheel 14 has a center plate member 16 mounted to a radial hub 18. As is typical, the outer tire 12 is sealably mounted onto the hub 18 of the outer wheel 14, while the plate member 16 is mounted with respect to a vehicle axle 20. Similarly, an inner inflatable tire 22 is mounted upon an inner wheel 24 in a conventional manner, with the inner wheel 24 having a center plate member 26 mounted to a radial hub 28 and the inner tire 22 being sealably mounted onto the hub 28 while the plate member 16 is mounted with respect to the vehicle axle 20. As is typical, the center plate members of the wheels are not solid. The plate member 16 has a plurality of apertures 30 therein adjacent the hub 18, which form spokes 32 on the plate member 16. The plate member 26 typically has a similar aperture and spoke configuration, with only one aperture 33 shown (see FIG. 2).

The tires 12 and 22, being inflatable, are each provided with valve stems for the insertion and removal of pressurized air from the tires. A valve stem 34 is mounted in outer wheel 14 for service to outer tire 12. A valve stem 36 is mounted in inner wheel 24 for service to inner tire 22. The valve stems are usually generally perpendicular to the vehicle axle, as seen in FIG. 2.

In place of the standard cap for the outer end of each valve stem 34 or 36, the present invention provides for mounting a tire pressure gauge assembly directly and "permanently" on the end of the valve stem. "Permanently" in this context means that the tire pressure gauge assembly is left on the valve stem at all times, even while the vehicle is in use. Thus, any time when the vehicle is stopped, an operator can observe the pressure in each of the tires without having to remove a cap from the tire's valve stem and use, in some manually manipulative way, a tire gauge.

Preferably, the tire pressure gauge assembly has a pressure gauge with a dial face type gauge. As seen in FIG. 3, gauge assembly 35 has a tire pressure gauge 40 which includes a gauge body plate portion 41 and a transparent plastic cover 42 sealably secured to the plate portion 41 so that the face of the pressure gauge 40 can be viewed by an operator.

The plate portion 41 and cover 42 cooperate to form a sealed chamber for the pressure sensitive components of the pressure gauge 40. This chamber within the pressure gauge 40 is in communication with the inside pressure of a tire via the valve stem for that tire and a conduit between the valve stem and pressure gauge 40.

In FIG. 3, a straight conduit 44 is shown, One end of the conduit 44 is sealably secured to the plate ortion 41 of the pressure gauge 40. At its other end, the conduit 44 has a first bore 48, which has internal threads 50. The threads 50 are designed to mate with external threads 52 on a valve stem (valve stem 36 is shown in FIG. 3). As is typical, the valve stem 36 has an internal valve needle 54. Depressing the valve needle 54 allows air to escape from a tire, or allows the introduction of air into a tire.

A lug 56 is positioned within the first bore 48 to engage the valve needle 54 when the gauge assembly 35 is threadably mounted onto the valve stem 36. A first rubber O-ring 57 is positioned in the first bore 48 between an annular shoulder 58 of the lug 56 and an inner shoulder 60 of the conduit 44. A finger 62 projects centrally from the shoulder 58 toward the open end of the bore 48 and has an end surface 64 for engaging the valve needle 54 when the conduit 44 is threadably mounted onto the valve stem 36. A second rubber O-ring 66 is provided in the first bore 48 about the finger 62 and between the annular shoulder 58 of the lug 56 and an outer end 67 of the valve stem 36. One or more passageways 68 extend through the lug 56 from its end 64 to its shoulder 58, allowing communication of the air within the tire and valve stem 36 and a second bore 70 in the conduit 44. The second bore 70 communicates with a pressure responsive tube of the air pressure gauge 40 (explained below) to indicate the air pressure within the tire on the gauge's dial face.

The use of two O-rings 57 and 66, one on each side of the shoulder 58 of the lug 56, permits an airtight seal to be achieved between the conduit 44 and valve stem 36, with some degree of rotational tolerance of the conduit 44 relative to the valve stem 36 allowed. In other words, the conduit 44 and gauge 40 mounted thereon can be aligned on the valve stem 36 to permit turning of the pressure gauge 40 and conduit 44 to a desired position relative to the valve stem 36 without sacrificing the airtight seal between the conduit 44 and valve stem 36. This permits the dial face of the pressure gauge 40 to be aligned for easy readability as, for example, seen in FIG. 1.

Referring to FIG. 2, it is seen that the valve stem 36 of the inner tire 22 extends outwardly from the tire 22, and generally to the side with respect to the vehicle. The dial face of a pressure gauge 40 having a straight conduit 44 mounted on the end of valve stem 36 is visible through one of the apertures 30 of the outer wheel 14, as seen at the top of FIG. 1.

On the outer wheel 14, however, the valve stem 34 faces inwardly with respect to the vehicle. Thus, a tire pressure gauge 40 having a straight conduit 44 mounted on the valve stem 34 would not have its dial face visible from the side of the vehicle (from the left as viewed in FIG. 2). To compensate for this, a gauge assembly 75 is provided with a modified conduit for sealably connecting the pressure gauge 40 to the inwardly facing valve stem 34 of the outer wheel 14. This modified conduit, designated as conduit 44a in FIGS. 2 and 4, has an L-shaped air passageway extending from a first end of the conduit sealably connected to the plate portion 41 of the pressure gauge 40 and a second end of the conduit which is threadably mated onto the valve stem 34. The second end of the conduit 44a is similar to the end of the conduit 44 which is adapted to receive the valve stem 34. Conduit 44a has a first bore 48a, which has internal threads 50a. The threads 50a are designed to mate with external threads on the valve stem 34 (not shown in FIG. 4). A lug 56a is positioned within the first bore 48a to engage the valve needle in the valve stem 34 when the gauge assembly 75 is threadably mounted onto the valve stem 34. A first O-ring 57a is positioned in the first bore 48a between an annular shoulder 58a of the lug 56a and an inner shoulder 60a of the conduit 44a. A finger 62a projects centrally from the shoulder 58a toward the open end of the bore 48a and has an end surface 64a for engaging the valve needle of the valve stem when the conduit 44a is threadably mounted onto the valve stem 34. A second O-ring 66a is provided in the first bore 48a about the finger 62a between the annular shoulder 58a of the lug 56a and an outer end of the valve stem. Although not illustrated and specifically in FIG. 4, it is understood that the valve stem 34 is similar in construction to the valve stem 36 illustrated in FIG. 3, and threadably mates within the bore 48a of conduit 44a in the same manner as discussed above with respect to bore 48 of conduit 44 and valve stem 36.

One or more passageways 68a extend through the lug 56a from its end 64a to its shoulder 58a, allowing communication of the air within the tire and valve stem 34 and a first bore section 80 in the conduit 44a. As seen in FIG. 4, the first bore section 80 is aligned longitudinally, and preferably axially, with the first bore 48a. The first bore section 80 and first bore 48a are preferably aligned parallel to the pressure gauge 40 and dial face therein. A second bore section 82 intersects the first bore section 80 and extends through the conduit 44a to its first end and into communication with the pressure chamber defined within the pressure gauge 40 by sealable connection of its plate portion 41 and cover 42. Preferably, the first bore section 80 is aligned generally perpendicularly with respect to the second bore section 82 in the conduit 44a.

As best seen in FIG. 2, when a pressure gauge 40 is mounted with respect to a valve stem 34 via conduit 44a, the pressure gauge 40 faces radially inwardly toward the center of the tire 22. The use of two O-rings 57a and 66a for sealably coupling the conduit 44a to the valve stem 34 permits alignment of the dial face of the pressure gauge 40 in position to be readably by an operator looking through one of the apertures 30 in the plate member 16 of the outer wheel 14, without sacrificing an airtight seal between the valve stem 34 and pressure gauge 40. The O-rings 57a and 66a are deformed with the conduit 44a is tightly threaded onto the valve stem 34, but are sufficiently resilient to permit at least one-half turn of the conduit 44a with respect to the valve stem 34 about 180°) to permit alignment of the pressure gauge for readability purposes (as seen in FIGS. 1 and 2).

In a preferred embodiment, conduit 44a includes a further check valve coupling 85. In FIG. 4, one contemplated configuration for mounting a check valve coupling 85 to the conduit 44a is shown. The passageway of the first bore section 80 extends past its connection with second bore section 82 and has a further passageway extension 86 which leads to a check valve (details not shown) which is actuated by depressing a check valve needle 88, in much the same manner as a typical valve stem is actuated. Thus, depression of the check valve needle 88 within a bore 90 at a coupling end of the check valve coupling 85 permits communication between the bore 90 and extension 86, thus allowing the introduction of pressurized air into the passageways 80, 82 and 86 in the conduit 44a, and in turn through the valve stem 34 and into the tire 12. The addition of a check valve coupling 85 permits pressurized air to be introduced into the tire 12 without removing the conduit 44a from the valve stem 34. When the check valve needle 88 is not depressed, it is biased into positions such that the check valve is closed and air is not allowed to pass from the passageway extension 86 into the bore 90 or vice versa.

Dial face type pressure gauges are well known. Typically, pressure is measured by a pressure measurement tube which includes a flattened tubular coiled spring. As seen in FIG. 5, a tube 100 is flattened and bent (as at 101), with the flattened portion 102 being wound in a coil around an axis defined by the tube 100. Pressure introduced into the tube tends to straighten the flattened and coiled portion of the tube, thereby causing the outermost end of the coil to move through an arc around its axis. An indicator needle 104 is secured on the outer end of the flattened and coiled portion 102 of the tube and moves annularly as pressure varies in the tube 100 and flattened and coiled portion 102. The pressure in the tube is indicated by the indicator needle 104 in combination with a dial face 106 which has suitable indicia thereon for providing relative pressure values. For example, the tires for semi-trailers or "eighteen wheelers" are preferably maintained at 100 psi. The pressure gauge 40 is thus preset to respond to pressures in a range about 100 psi, and the dial face 106 is provided with specific gradients for pressure values from 0 psi to 160 psi (for other uses, the gauge is preset to other desired pressure ranges). The needle indicator 104 is also of a suitably contrasting color from the dial face to permit easy readability.

In a preferred embodiment, the dial face comprises or is coated with a light reflective material, such as SCOTCHLITE brand reflective coating of Minnesota Mining and Manufacturing Company. Further, this coating is preferably yellow, as indicated as 108 in FIG. 5, for further illumination advantages. The gradient marks and pressure indicia are then printed or applied over the reflective surface of a dial face 106 in a contrasting color, such as black, as is the needle indicator 104. By using a reflective dial face, night reading of the pressure gauge 40 is greatly enhanced. A flashlight beam will brightly illuminate the reflective dial face 106 for easy and quick reading thereof.

In another dial face embodiment, the dial face has a red background color, except for an acceptable range of 10 psi centered about the 100 psi marking thereon, and the acceptable range is of a different background color. By using distinct primary colors to differentiate the acceptable pressure range on the dial face, an operator can quickly ascertain whether a tire is properly inflated by looking to see whether the indicator needle is within the acceptable (green) pressure range. In this embodiment, the indicator needle is yellow to further aid visual acuity. It is also contemplated that the dial face be arranged with suitable operable connections, to be digital in readout form.

The air pressure gauge assembly of the present invention is designed to be "permanently" mounted upon a vehicle's tire. It is not intended to be used only when the pressure is to be checked, but is intended to be positioned on the valve stem of the tire and left there during vehicle use. This subjects the air pressure gauge 40 to an extremely harsh environment, including exposure to snow, rain, heat, mud, harring and bumping. Furthermore, the mounting of the tire pressure gauge 40 is subjected to significant centrifugal forces as the tire rotates during travel.

To prevent distortion of the flattened and coiled portion 102 of the tube 100 by the centrifugal forces and other jarring, a radial expansion limiter 108 is mounted on the cover 42 of the pressure gauge 40. As seen in FIGS. 5 and 6, the limiter 108 has an annular portion 110 and wing portions 112 and 114 extending therefrom. The annular portion 110 is coaxial with the axis of the coiled portion 102 and is radially spaced from the outermost portions of the flattened and coiled portion 102 of the tube 100. When centrifugal forces cause radial expansion of the flattened and coiled portion 102, such expansion is limited to the radius of the annular portion 110 of the limiter 108. Thus, possible distortion to the pressure gauge's accuracy as a result of forced expansion thereof (i.e., by centrifugal force) is limited as well. The wing portions 112 and 114 are further provided to limit distortion of the flattened and coiled portion 102 by engagement with the indicator needle 104. The wing portions 112 and 114 are not essential to the desired operation of the limiter 108, however, since once the coiled portion 102 expands radially to engage the annular portion 110 of the limiter 118, further such expansion is precluded. As seen in FIGS. 5 and 6, the annular portion traverses an arc of at least 180°.

Figure 7:
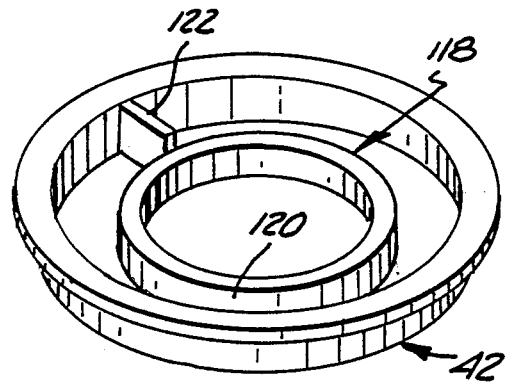
FIG. 7 is a pictoral bottom view of another embodiment of the transparent dial face cover of the tire-mounted pressure gauge of the present invention.

Another preferred embodiment of the radial expansion limiter is shown in FIGS. 7 and 8. In this embodiment, the radial expansion limiter is designated by reference number 118, and consists of a cylindrical wall 120 mounted on the underside of the cover 42. The cylindrical wall 120 is coaxial with respect to the axis of the coiled portion 102 and is radially spaced from the outermost portions of the coiled portion 102 of the tube 100 when the tire pressure gauge is assembled as seen in FIG. 8. The cylindrical wall 120 is not as deep as the cover 42, and thus the cylindrical wall 120 allows the needle indicator 104 to pass freely underneath when assembled as seen in FIG. 8. Radial expansion of the flattened and coiled portion 102 of the tube 100 by centrifugal forces is thus limited to the radius of the cylindrical wall 120 of the radial expansion limiter 118. This limits distortion of the tube 100 over time and use.

The radial expansion limiter 118 may also include a wing portion 122, designed to hang below the bottom edge of the cylindrical wall 120 and engage the indicator needle 104 at a "bottom-out" position of the gauge. The inclusion of wing portion 122 is not necessary, however, for the limiter 118 to properly function to limit distortion of the coiled portion 102 of the tube 100 by external forces since further radial expansion of the coiled portion 102 is prevented once it engages the cylindrical wall 120.

As seen in FIGS. 6, 7, and 8, the radial expansion limiters 108 and 118 are preferably formed integrally with the plastic cover 42 and extend to a depth within the cover 42 to be in position to engage the flattened and coiled portion 102 when the pressure gauge 40 is assembled for use. The limiters 108 and 118 are designed, of course, so that they do not interfere with the pressure reading function of the pressure gauge 40, or with normal desired movement of its indicator needle 104.

Although the present invention has been described with reference to preferred embodiments, workers skilled in the art will recognize that changes may be made in form and detail without departing from the spirit and scope of the invention.

What is claimed is:

1. A tire-mounted air pressure gauge assembly for use on vehicles having inflatable tires wherein each tire has a valve stem with a conventional valve core therein, the pressure gauge assembly comprising:
    an air pressure gauge having a dial face with a light-reflective background which covers substantially the entire dial face and has contrasting pressure indicia thereon for indicating the air pressure detected by the gauge; and
    an adapter having means for affixing the gauge to the valve stem with an airtight connection, including means for depressing the valve core of the valve stem to allow air and pressure from the tire to pass through the adapter and to the gauge, with the adapter shaped to present the dial face in direction away from that portion of the tire adjacent the valve stem.

2. In combination with a tire pressure gauge and a wheel having an inflatable tire mounted thereon, the tire having a valve stem with a conventionally depressible valve core therein, the valve stem extending longitudinally from a first side of said tire in direction generally parallel to the tire's rotational axis, toward a second opposite side of said tire and through an aperture in the wheel, the improvement which comprises:
    the gauge being a dial-type gauge having a dial face with a light-reflective background which covers substantially the entire dial face and has contrasting pressure indicia thereon and a pressure responsive indicator needle pivotally mounted with respect to the dial face; and
    an air pressure conduit threadably and sealably mounted at a first end thereof onto the valve stem and sealably connected at a second end thereof to the tire pressure gauge, the first end of the conduit having means for continuously depressing the valve core of the valve stem to allow air pressure from the tire to bleed through the conduit to the tire pressure gauge, and the conduit formed and aligned to readably present the dial face of the tire pressure gauge through said aperture in the wheel to an operator positioned on the first side of the tire.

3. The invention of claim 2 wherein the indicator needle is mounted on a coiled pressure responsive spring which expands under pressure, and wherein the pressure gauge has retainer means for limiting radial expansion of the coiled spring beyond a desired radial expansion limit.

4. For use with a tire-mounted air pressure gauge which has a spring chamber, a coiled spring responsive to tire air pressure mounted within the spring chamber and a pressure indicator needle mounted on the outer end of the coiled spring to extend radially outwardly therefrom, the improvement which comprises:
    arc-shaped wall means mounted within the spring chamber, the wall means being aligned between the coiled spring and an inner wall surface of the spring chamber for engaging an arcuate portion of the coiled spring to prevent radial expansion of the coiled spring beyond a predetermined radius and thus prevent the pressure indicator needle from contacting the inner wall surface of the spring chamber.

5. The invention of claim 4 wherein the arc-shaped wall means traverses an arc of at least 180°.

6. For use with a tire-mounted air pressure gauge which has a coiled spring responsive to tire air pressure, a dial face and a transparent cover portion thereover, the improvement which comprises:
    arc-shaped wall means formed integrally with the cover portion, with the arc-shaped wall means radially spaced from a most outward section of the coiled spring of the gauge for engaging an arcuate portion of the coiled spring to prevent radial expansion of the coiled spring beyond a predetermined radius.

7. The invention of claim 4 wherein the arc-shaped wall means comprises a cylindrical wall coaxially aligned about the coiled spring.

8. For use with a tire-mounted air pressure gauge which has a coiled spring with a pressure indicator needle mounted thereon, wherein the coiled spring is responsive to tire air pressure, the improvement which comprises:
    arc-shaped wall means, having first and second ends, radially spaced from a most outward section of the coiled spring of the gauge for engaging an arcuate portion of the coiled spring to prevent radial expansion of the coiled spring beyond a predetermined radius; and a radially extending wing portion secured to each end of the wall means to extend outwardly therefrom in position to engage the pressure indicator needle.

9. An air pressure gauge for use on an inflatable tire which has a valve stem with a conventionally depressible valve core therein, the pressure gauge comprising:

a base portion threadably and sealably mounted on a valve stem;

means for depressing the valve core of the valve stem when the base portion is mounted on the valve stem;

a gauge housing mounted with respect to the base portion and having a spring chamber defined therein;

a coiled pressure responsive tube mounted within the spring chamber of the housing for communication with the valve stem through the base portion, the coiled tube being expandable under pressure; and arc-shaped retainer means mounted coaxially with respect to the coiled tube and aligned between the coiled spring and an inner wall surface of the spring chamber for limiting radial expansion of the coiled tube beyond a desired radial expansion limit defined by the radius of the arc-shaped retainer means.

10. For use with a tire-mounted air pressure gauge of the type having a coiled spring responsive to tire air pressure and an indicator needle secured to a radially outward end of the coiled spring, the improvement comprising:

retainer means for preventing expansion of the coiled spring beyond a predetermined radius, the retainer means including an arc-shaped wall radially spaced from a most outward section of the coiled spring of the gauge for limiting radial expansion of the coiled spring, and first and second wing portions integrally formed with the annular wall and extending generally radially outward from the wall for engaging the indicator needle.

11. For use with a tire-mounted air pressure gauge of the type having a spring chamber and a coiled spring responsive to tire air pressure mounted within the spring chamber, the improvement comprising:

cylindrical retainer wall means coaxially positioned with respect to the coiled spring and aligned between the coiled spring on an inner wall surface of the spring chamber for engaging the coiled spring when a predetermined radial expansion limit thereof has been reached, thereby preventing unlimited radial expansion and operative distortion of the coiled spring.

12. For use with a tire-mounted air pressure gauge which as a coiled spring with a pressure indicator needle mounted thereon, wherein the coiled spring is responsive to tire air pressure, the improvement which comprises:

arc-shaped wall means, having first and second ends, radially spaced from a most outward section of the coiled spring of the gauge for engaging an arcuate portion of the coiled spring to prevent radial expansion of the coiled spring beyond a predetermined radius; and a radially extending wing portion secured to one end of the wall means to extend outwardly therefrom in position to engage the pressure indicator needle.

* * * * *